2,704,006

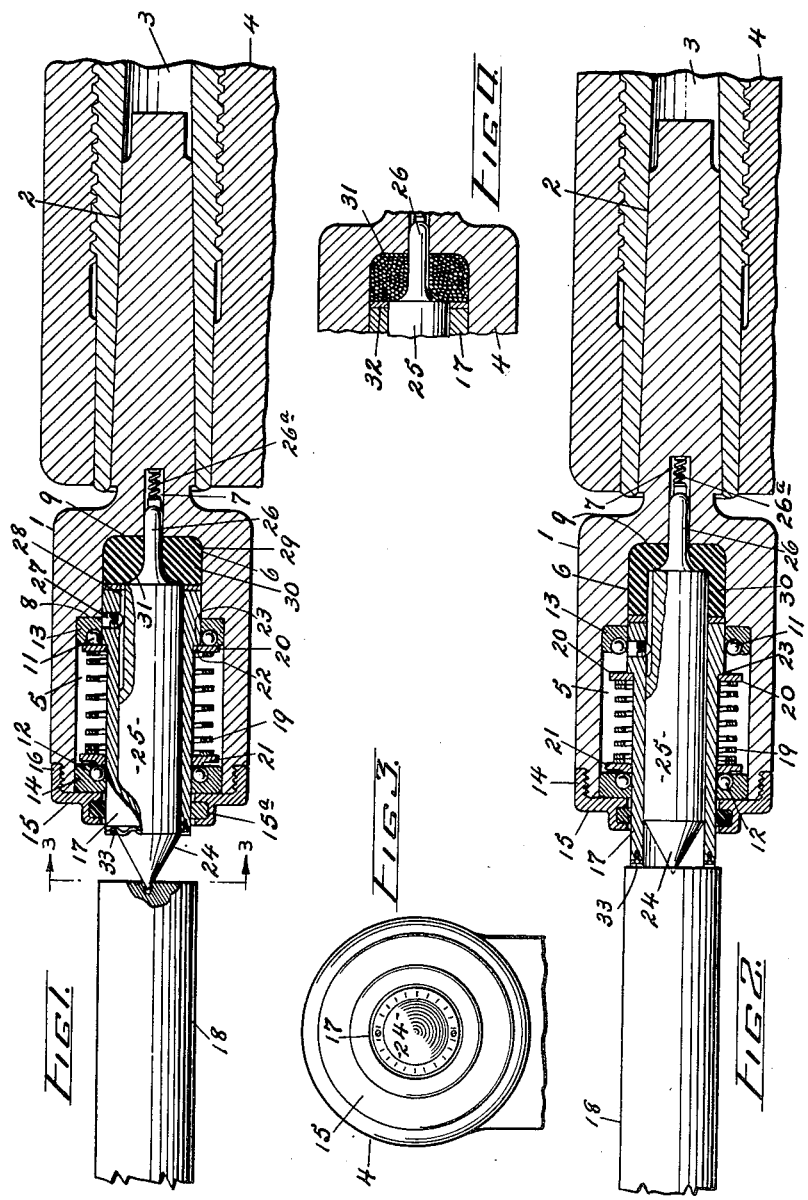

LATHES

Willi C. Rost, Toronto, Ontario, Canada

Application May 4, 1953, Serial No. 352,852

7 Claims. (Cl. 82—33)

The invention relates generally to lathes and more specifically to means for centering the work and holding it steady while it is being operated on.

The principal object of the invention is to provide means for steadying the work while it is being operated on, which means shall be entirely automatic under the control of the centering device and subject to recession and advancement in accordance with the centering means, so as to allow free axial expansion of the work without putting the centering and steadying means under excessive strain but at the same time maintaining effective control over the work.

A further object of the invention is to provide work supporting and steadying means which is held against rotation independently of the centering device but which is capable of longitudinal movement relative to said centering device, whereby rotation of these elements is coincident but each may move in opposite directions longitudinally.

And generally the objects of the invention are to provide a lathe having cooperating work centering and steadying means which will prove efficient in use; which is of simple and sturdy construction and which can be produced at reasonable cost.

With the above and other objects in view the invention consists in the novel features of construction, arrangements and combinations of parts set out in the present specification and more particularly pointed out in the claims for novelty following.

In describing the invention reference will be made to the accompanying drawings, in which:

Figure 1 is a vertical longitudinal section through my improved centering and steadying device in process of being operatively associated with a work piece, the associated part of the tailstock being shown in longitudinal section.

Figure 2 is a similar view to Figure 1 but with the work centering and steadying parts in full operational association with the work.

Figure 3 is a front elevation of the device taken on the line 3—3 of Figure 1.

Figure 4 is a longitudinal section through a part of a center housing showing a modification of the invention.

Like numerals of reference indicate corresponding parts in the various figures.

Referring to the drawings 1 indicates a cylindrical housing for the work centering and holding means, which housing has an integral, rearwardly extending shank 2 fitting the axial bore 3 of an adjustable tailstock structure 4, the specific construction of which latter is not shown as it may be of conventional type.

The housing 1 is preferably cylindrical and is provided with a large bore 5 entering its end opposed to the shank 2, which is hereinafter termed its front end. The bore 5 extends inwardly in even diameter for a considerable distance, preferably to a point rearwardly of the longitudinal center of the housing and is then reduced abruptly to provide a continuation 6 of considerably lesser diameter and of somewhat less length than the part 5 and this continuation 6 is also reduced to provide a cylindrical blind spring housing 7. The sections 5, 6 and 7 of the bore of the housing are concentric with one another and the various reductions thereof provide annular forwardly facing shoulders 8 and 9, respectively, for the purpose described hereinafter.

11 and 12 are annular ball bearing units positioned within the large forward bore 5 and concentric thereto, the bearings 11 operating in an annular race 13 abutting the shoulder 8 and the inner end of the said bore and the bearings 12 operating in a race 14 positioned in the front end of the said bore and confined therein by means of a ring plate 15 which overlaps the outer margin of the bore 5 to a distance preferably slightly less than the depth of the races 13 and 14 and has an interiorly threaded flange 16 threading over the front end of the housing 1. The bearings of the units 11 and 12 are confined within suitable recesses in the inner corners of the respective races and extend inwardly slightly beyond the races towards the axial centre of the bore 5 to provide bearing supports at the ends of the bore 5 in which a sleeve 17 may rotate and also move lengthwise of said bore.

The sleeve 17, which constitutes the means for exerting a steadying influence against the end of the work piece 18 is of somewhat greater length than the bore 5 so that it extends rearwardly of said bore and terminates within the reduced intermediate bore 6 a short distance rearwardly of the shoulder 8 and at its front end projects forwardly beyond the plate 15 when the device is in its inoperative position. The sleeve is of the proper exterior diameter to slide lengthwise of the intermediate bore 6.

A coil spring 19 loosely encircles the sleeve 17 within the front bore 5 and is held in compression lengthwise of said bore between ring plates or washers 20 and 21 which loosely encircle the sleeve 17 and are limited in their movement away from one another by the bearing races 13 and 14.

The plate 20 has an inner marginal part 22 adapted to lie in the path of a forwardly facing annular shoulder 23 on the sleeve 17 so that the spring 19 will be compressed on the forward movement of the sleeve 17 under pressure from the rear end, and on the release of such pressure on the sleeve from the rear, will rebound to return said sleeve to its previous position.

24 is a lathe center of conventional conical form, being the forward end of a cylindrical member 25, which latter is of even diameter for a distance approximating the length of the sleeve 17 and is of a sliding fit within said sleeve. The body member 25 has a slender rearward extension 26 which passes through the part of the intermediate bore 6 behind the body of the member 25 and extends into the narrow spring housing 7 into endwise engagement with a coil spring 26a confined under compression between the said end of said extension 26 and the closed end of the spring housing and exerting forward pressure against said extension 26.

The center support 25 is keyed to the sleeve 17 against independent rotary movement by means of a pin, or screw, 27 which extends inwardly through the wall of the sleeve 17 and terminates within a groove 28 which extends longitudinally of the member 25. It will thus be seen that while the center and the sleeve 17 are held against independent rotary movement they are allowed limited longitudinal movement in respect to each other.

In order to close the open end of the slot or groove 28 against the entrance of the pressure insert 30 therebehind, whether such insert consists of rubber, or of other material, it is preferable that a washer 32 be placed around the center 25 at the end of the sleeve 17.

The portion of the intermediate bore 6 behind the center body 25 and through which the slender extension or stem 26 extends provides a chamber 29 defined at one end by the washer 32 at the inner end of the sleeve 17 and the part of the center body 25 around the base of the stem 26, and at the other end by the shoulder 9. This chamber has its diameter equal to that of the exterior diameter of the sleeve 17 and is packed with a mass 30 of springy material, such as rubber, of a considerable density which, on the forward movement of the tail stock to bring said sleeve and the center into engagement with the work will be subjected to compression, after the center has engaged the work, particularly towards the side wall of the chamber due to the fact that the stem 26 of the center body is formed with an endwise tapered and curved annular base part 31 which tends to force the resilient mass towards the side of the chamber. This compression of the resilient material within the chamber, caused by the forward movement of the tail stock, and the deflection of the compressed material laterally, causes the resilient material under compression to expand forwardly against the washer 32 facing the rear end of the sleeve 17 and thus cause the sleeve to move forwardly into endwise engagement with the work. The spring 26a exerts continual pressure on the stem 26 to hold the center into engagement with the work.

A buffer 33 consisting of a thin corrugated sheet of metal is secured over the annular front face of the sleeve 17 and provides a facing adapted to engage the work while the latter is being operated upon.

In the use of the invention, the work is first centered at one end by means of the usual work center carried by the head stock, after which the tail stock is moved in the usual manner towards the unsupported end of the work so that the pointed end of the center eventually enters the opening provided in the end of the work. Upon engagement of the center with the work the resistance provided by the work will prevent further movement of the center but the spring 26a which is under compression between the end of the center and the closed end of the housing 7 will exert pressure against the stem 26 to hold the center in engagement with the work. Thus far in the movement of the tail stock there has been no relative movement of the center and the sleeve 17 and said sleeve is in the retracted position shown in Figure 1 but, upon discontinuance of forward lengthwise movement of the center due to the presence of the work continued forward movement of the tail stock will result in the material 30 in the chamber 29 being compressed between the end 9 of the chamber and the curved or recessed part 31 of the center body and the washer 32 around the end of the sleeve 17 with the result that the outwardly deflected and compressed material 30 will be forced forwardly against the washer and will thus cause the sleeve to be moved forwardly until the buffer 33 rests in firm engagement with the work around spaced from the pointed center 24. During the forward movement of the sleeve the spring 19 will be compressed through the pressure of the plate 20 which has the annular part 22 thereof positioned in the path of the shoulder 23.

When the work is to be released, the tail stock is moved away from the work thus releasing the pressure on the insert 30 and upon the spring 26a, so that the spring 19 will return the sleeve to its retracted position and the spring 26a will cause the center to move forwardly to a position forwardly of the sleeve 17, as shown in Figure 1.

In Figure 4 a modified structure is shown in which the yieldable filling for the chamber 29 formed in the intermediate bore 6 behind the sleeve 17 and the center body 25 consists of an appropriate number of pellets 31, of steel or other suitably hard material.

While I have illustrated and described the present preferred forms of construction for carrying out my invention, this is capable of variation and modification without departing from the spirit of the invention. I, therefore, do not wish to be limited to the precise details of construction set forth, but desire to avail myself of such variations and modifications as come within the scope of the appended claims.

What is claimed is:

1. In a lathe center unit, a housing adapted to be secured in the tail stock of a lathe, a sleeve rotatable in and movable lengthwise of said housing, a lathe center having a body slidably fitting within said sleeve, said body being keyed to said sleeve for coincident rotary movement but being capable of independent movement lengthwise of said sleeve, spring means influencing said sleeve to a retracted position within said housing, spring means exerting yielding pressure on said center body whereby said center in its inoperative position will project forwardly beyond said sleeve, and means compressible between the rear ends of said sleeve and said body and the interior end wall of said housing on the forward movement of the housing subsequent to the engagement of the work by the center to exert forward pressure against the rear end of said sleeve to move the forward end thereof into engagement with the work.

2. In a lathe center unit, a housing adapted to be secured in the tail stock of a lathe, said housing having a bore entering its forward end, the said bore for a portion of its length being of relatively large diameter and being reduced abruptly to provide a relatively short intermediate portion of lesser diameter than the said initial part, said bore again being reduced in diameter abruptly to provide a blind spring housing, a sleeve extending through said initial bore and terminating in a sliding fit within said intermediate bore, said sleeve being rotatable and also being capable of longitudinal movement whereby it may be projected from the forward end of said housing, spring means influencing said sleeve to a retracted position wholly within said housing, a center having a body positioned within said sleeve, means connecting said body and said sleeve whereby said body will rotate with said sleeve but is capable of lengthwise movement independently of said sleeve, the said center body having a rearwardly extending stem entering said blind spring housing, spring means within said blind spring housing exerting yieldable pressure forwardly against said stem, to influence said center forwardly of said housing, and means compressible between the rear ends of said sleeve and said body and the interior end wall of said housing on the forward movement of the housing subsequent to the engagement of the work by the center to exert pressure against the rear end of said sleeve to move the forward end thereof into engagement with the work.

3. A lathe center unit as set forth in claim 2, characterised by bearings positioned within and at opposite ends of said initial bore circumferentially of said sleeve.

4. A lathe center unit as set out in claim 2, in which said spring means influencing said sleeve to a retracted position comprises a coil spring encircling said sleeve, and means carried by said sleeve engaging the rear end of said spring and compressing said spring in the forward movement of said sleeve to return said sleeve to its retracted position on the release of pressure against said sleeve.

5. A lathe center unit as set out in claim 2, wherein said stem extends through said compressible means and is characterised by an annular, curved base part adapted during the compression of said compressible means to deflect same radially over the end of said sleeve.

6. A lathe center unit according to claim 1, characterised by an annular transversely corrugated facing member secured over the annular forward face of said sleeve.

7. In a lathe center unit, a housing adapted to be secured in the tail stock of a lathe, said housing having a bore entering its forward end, the said bore for a portion of its length being of relatively large diameter and being reduced abruptly to provide a relatively short intermediate portion of lesser diameter than the initial part, said bore again being reduced in diameter abruptly to provide a blind spring housing, a sleeve extending through said initial bore and terminating in a sliding fit within said intermediate bore, said sleeve being rotatable and also being capable of longitudinal movement whereby it may be extended from the forward end of the housing, an annular cap threading onto the front end of said housing around said sleeve, annular bearings within said initial bore at opposite ends thereof receiving said sleeve, washers encircling said sleeve in spaced relation to each other between said bearings, a coil spring confined in compression between said washers and influencing said sleeve to a retracted position within said housing, means carried by said sleeve adapted on the forward movement of said sleeve to engage the rear face of the rearmost of said washers to compress said spring on the forward movement of said sleeve, a center having a body positioned within said sleeve, means connecting said body and said sleeve whereby said body will rotate with said sleeve but is capable of lengthwise movement independently of said sleeve, the said center body having a rearwardly extending stem entering said blind spring housing, spring means within said blind spring housing exerting pressure forwardly against said stem, to influence said center to a position beyond the front end of said housing, means within said intermediate bore adapted to be compressed between the rearmost end of said intermediate bore and the inner end of said center body on the forward movement of said housing subsequent to the engagement of the center with the work whereby pressure will be exerted against the rear end of said sleeve to force the sleeve outwardly into engagement with the work, and means exerting radial pressure on said compressible means at the base of said stem to increase the degree of pressure of said compressible means against the end of said sleeve.

References Cited in the file of this patent

UNITED STATES PATENTS

| | | |
|---|---|---|
| 1,285,350 | Palmgren | Nov. 19, 1918 |
| 1,336,548 | Amundsen | Apr. 13, 1920 |
| 2,056,586 | Rohm | Oct. 6, 1936 |
| 2,545,852 | Kurzweil | Mar. 20, 1951 |